United States Patent [19]

Rodman

[11] Patent Number: 4,587,610
[45] Date of Patent: May 6, 1986

[54] ADDRESS TRANSLATION SYSTEMS FOR HIGH SPEED COMPUTER MEMORIES

[75] Inventor: Paul K. Rodman, Ashland, Mass.

[73] Assignee: Prime Computer, Inc., Framingham, Mass.

[21] Appl. No.: 578,796

[22] Filed: Feb. 10, 1984

[51] Int. Cl.⁴ .............................................. G06F 12/10
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,292,152 | 12/1966 | Barton | 364/200 |
| 3,576,543 | 4/1971 | Melliar-Smith | 364/200 |
| 3,676,857 | 7/1972 | Jackson | 364/200 |
| 3,764,996 | 10/1973 | Ross | 364/200 |
| 3,786,427 | 1/1974 | Schmidt et al. | 364/200 |
| 3,938,100 | 2/1976 | Steiner | 364/200 |
| 4,056,845 | 11/1977 | Churchill | 364/200 |
| 4,079,453 | 3/1978 | Dahl | 364/200 |
| 4,084,225 | 4/1978 | Anderson et al. | 364/200 |
| 4,084,226 | 4/1978 | Anderson et al. | 364/200 |
| 4,084,227 | 4/1978 | Bennett et al. | 364/200 |
| 4,084,231 | 4/1978 | Capozzi et al. | 364/200 |
| 4,084,234 | 4/1978 | Calle et al. | 364/200 |
| 4,128,882 | 12/1978 | Dennis | 364/200 |
| 4,151,593 | 4/1979 | Jenkins et al. | 364/200 |
| 4,168,541 | 9/1979 | DeKarske | 364/200 X |
| 4,177,510 | 12/1979 | Appell et al. | 364/200 |
| 4,240,136 | 12/1980 | Kjoller | 364/200 |
| 4,241,401 | 12/1980 | DeWard et al. | 364/200 |
| 4,277,825 | 7/1981 | Collins et al. | 364/200 |
| 4,279,014 | 7/1981 | Cassonnet et al. | 364/200 |
| 4,280,177 | 7/1981 | Schorr et al. | 364/200 |
| 4,290,105 | 9/1981 | Cichelli et al. | 364/200 |
| 4,388,685 | 6/1983 | Kotok et al. | 364/200 |

*Primary Examiner*—Raulfe B. Zache
*Attorney, Agent, or Firm*—Lahive & Cockfield

[57] ABSTRACT

An address translation method and apparatus is disclosed for use in an auxiliary memory of a computer, which stores data in association with a tag defining its location in a main memory, and also includes a buffer for storing a plurality of addresses together with translations of the corresponding main memory locations, permitting data obtained from the auxiliary memory to be validated by comparing the tag with the translation from the buffer. An improvement in the auxiliary memory is disclosed consisting of a content addressable memory (CAM) for storing translations not found in the buffer. The CAM is adapted so that it can be searched for a translation and the translation, if found in the CAM, is employed to verify data in the auxiliary memory.

17 Claims, 2 Drawing Figures

ADDRESS TRANSLATION SYSTEMS FOR HIGH SPEED COMPUTER MEMORIES

BACKGROUND OF THE INVENTION

The present invention is in the field of data processing and, in particular, relates to high speed auxiliary memories.

In many data processing systems where service is provided to a number of users, it is preferred to make use of a virtual memory architecture. Typically, virtual memory is divided into segments each of which is further divided into pages with each page accomodating a predetermined maximum number of words. In a number of systems, for example the Series 50 systems manufactured by Prime Computer, Inc. of Framingham, Mass., the addresses of the segments and pages are allocated by an operating system and can be arranged in the main memory in a random fashion. To the user, however, an appearance of continuity and unlimited memory space is presented and the user need not be concerned with the actual interleaved nature of programs in the main memory.

Because of the distributed reality of programs within the main memory as well as the time and energy necessary to retrieve data from the memory, it is also preferred to employ a smaller auxiliary memory or data cache to store data which are most likely to be needed by the user at a particular time. For this purpose, a data cache formed from Random Access Memory (RAM) units is often employed and typically stores 2 to 64 kilobytes of data. One convenient method for loading a data cache is to store data according to the lower order virtual address bits. For example, an entry at location 5 of a user's virtual page will be stored at location 5 in the data cache. However, this scheme alone does not assure that data retrieved from a particular location in the cache will be valid because a user can have more than one page of virtual memory and a data cache loaded in this fashion does not distinguish between virtual pages.

In order to validate data from the cache, an address translation is performed using an address tag (which is obtained along with the data from the cache when it is accessed) and an address translation element which is also most often implemented in RAM hardware. One known structure is called a lookaside buffer and essentially operates by storing main memory addresses and confirmation tags in association with particular virtual addresses. When the lookaside buffer is addressed, it returns a physical address and a tag to confirm the virtual address. If the physical address in the lookaside buffer does not match the address tag associated with the data, a data cache miss occurs (i.e., the data in the cache is from a different page) and the physical address from the lookaside buffer is and used to retrieve the proper data from the main memory.

It is also possible for a miss to occur in the lookaside buffer since only a finite number of address translations can be stored at any given time. Because virtual address space is so large, it is not practical to incorporate into the auxiliary memory a table that will tell a user where every page is located.

A number of techniques have been proposed for improving the process of address translation within the lookaside buffer. One technique, known as "hashing" is based upon the observation that users often do not program the full number of pages available in each of their segments. Instead, programs tend to execute in the beginning or first half of a segment. Therefore, an encoder can be used to "hash" some of the address bits which define the location of a page within a segment together with other address bits that define the segment number as well. The result is a "hash table" which fills the lookaside buffer according to a code with information from the virtual addresses (i.e., some of the lower bits that define the page as well as some of the bits that define the segment number) in a manner that ensures that the lookaside buffer contains more translations. Through hashing, the probability of finding an address translation in a lookaside buffer can be increased.

Nonetheless, a miss in the lookaside buffer can occur and causes substantial decline in computer performance. In most designs, microcoded instructions take over when an address miss occurs, freezing all data processing operations in mid-sequence and then prompting the operating system to find the virtual address translation. This problem can be serious in programs that have poor locality of reference.

One of the locality problems associated with address misses is called a "thrash" and occurs when two often-used components of a program compete for the same location in the lookaside buffer. A thrash can occur, when no hash table is used, if two related components of the program have identical address bit sequences and these sequences are chosen by the architecture to load the lookaside buffer. Similarly, a thrash can be created even when a hash table is employed to load the buffer if the addresses for two components of program are mapped into the same location in the buffer. Thrashing is most serious, for example, if a repetitive instruction and its operand must compete for the same location in the buffer; instead of performing a tight processing loop, the program is executed fitfully as the processor must employ microcoded instructions over and over again to obtain address translations.

There exists a need for improved address translation systems when used in conjunction with data caches to form high speed auxiliary memories. In particular, a system that could improve the efficiency of lookaside buffers in translating virtual-to-physical addresses would satisfy a long-felt need in the industry.

SUMMARY OF THE INVENTION

It has been discovered that the execution of programs having poor locality of reference can be greatly improved through the use of a small Content Addressable Memory (CAM) as a backup to the address translating devices typically used in mapping virtual memory to physical memory addresses. In one preferred embodiment, the backup memory unit is a content addressable memory implemented in hardware and can be as small as four entries and still result in significant time savings. Alternatively, the backup function can be performed by microcode emulating a content addressable memory.

This invention is especially useful in systems which employ data caches and Segmentation Table Lookaside Buffers (STLBs), or their equivalents as auxiliary memories to store data for ready retrieval. In particular, when a "hashing" algorithm is used by the system to increase the number of different address translations stored in the lookaside buffer, the invention can be used to greatly reduce the chance of repeated "thrashing".

The invention will next be described in connection with certain preferred embodiments. However, it should be clear that various changes and modifications can be made by those skilled in the art without departing from the spirit or scope of the invention. For example, while the invention is next described as a backup for a lookaside buffer containing hashed address translations, it should be noted that equivalent uses of my invention can be made with address translation buffers not filled by a hashing algorithm as well as with hash tables implemented by RAM elements for other purposes.

DESCRIPTION OF THE PREFERRED EMBODIMENTS

Figure 1:
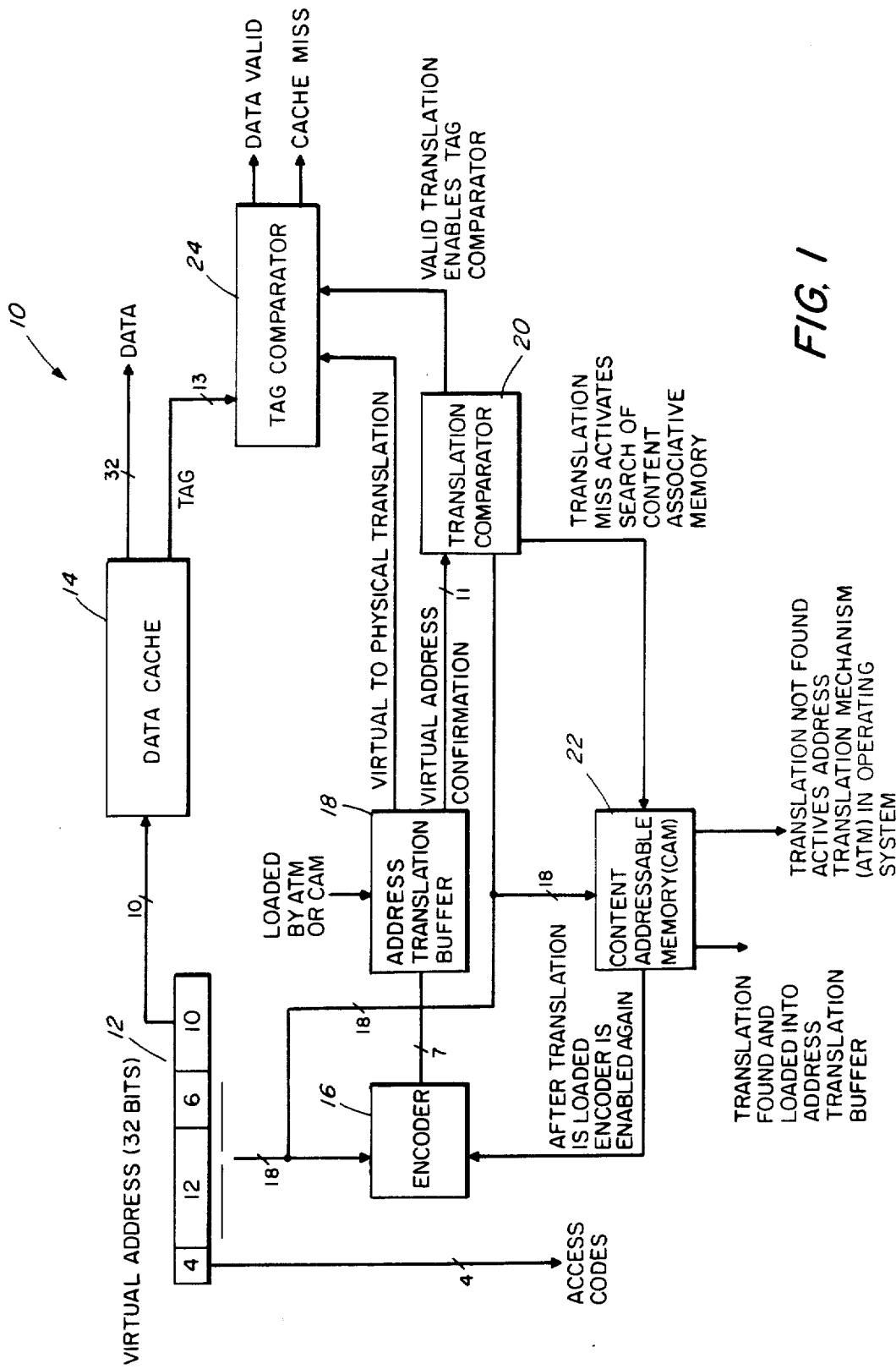
FIG. 1 is a schematic block diagram of the address translation system for computer memories.

In FIG. 1, a schematic block diagram of an auxiliary memory system 10 includes a data cache 14, an encoder 16, an address translation buffer 18, a translation comparator 20, a content addressable memory 22 and a data tag comparator 24. In function, the data cache 14, encoder 16 and address translation buffer 18 in the present embodiment are similar to corresponding elements in the Series 50 systems manufactured by Prime Computer, Inc., Framingham, Mass.

In the illustrated embodiment, a thirty-two bit wide virtual address is used to access the auxiliary memory system 10. The virtual address 12 is used by system 10 to retrieve data stored in cache 14 and to verify its validity. As described in more detail below, the lowest ten bits of the virtual address are identical to the lowest ten bits of the corresponding physical address and are used to prompt the data cache 14 directly. The next eighteen bits of the virtual address provide the information necessary to obtain the page and segment numbers of the physical address. The final four bits of the virtual address relate to access codes that are not important to the understanding of the present invention.

In the illustrated embodiment of FIG. 1, the data cache 14 can be a 1024 location random access memory where each of the word locations includes a tag portion (in this instance thirteen bits wide) and an associated data portion (thirty-two bits wide). The cache 14 is formatted such that the word number (i.e., address) of each word stored in succession in the cache memory is representative of and in the illustrated embodiment is identical to the ten low-order, location-defining bits of its physical address in the main memory. That is each data cache entry fully specifies a location in main memory (the word number and the tag bits), and the contents of that location. In operation, the cache is designed to make this information available to the processor, on request, on a high speed basis.

The encoder 16 performs a hashing function on the higher order bits of the virtual address 12 to obtain an address for prompting address translation buffer 18. In the illustrated embodiment, the eighteen virtual address bits which define the page and segment location of a particular data word are encoded by encoder 16 into a seven bit abbreviated address. An identical encoding method is used by microcode (not shown) to load the "translations" into address translation buffer 18.

Buffer 18 is also implemented in random access memory and can be, for example, 128 locations deep. Each location must be wide enough to store a physical address (i.e., thirteen bits in the illustrated embodiment corresponding to the tag bits of the data cache) and also enough of the virtual address to confirm the translation. (Since in the embodiment of FIG. 1, eighteen bits are "hashed" into a seven bit code which addresses buffer 18, the buffer 18 also stores the remaining eleven bits of the virtual address to ensure that the coded virtual address is the same and, hence, that the translation is valid). Buffer 18 can also include other address-related information, such as access information, not relevant to the present invention.

The translation comparator 20 and the tag comparator 24 can be implemented by conventional hardware (i.e., a set of parallel EXCLUSIVE OR gates). Translation comparator 20 compares the eleven virtual address confirmation bits of the addressed buffer entry with the corresponding eleven bits from the virtual address 12 and produces a valid translation signal when the bit strings match. When this occurs the data tag comparator 24 is enabled and the thirteen bit physical address from buffer 18 is compared with the thirteen bit tag which was stored in the cache 14. If these bit strings also match, the data in cache 14 are valid and can be read by a processor (not shown) and operated upon. If the tags do not match, the data in the cache 14 are from a different page of the user's memory and the proper data must be fetched from a main memory or storage disks (not shown) using the address available from buffer 18.

The present invention is directed primarily to situations where an address translation is not found in the buffer 18 (i.e., the confirmation tag does not match the virtual address when the two are compared in comparator 20). Normally in the prior art, a routine in the operating system called an address translation mechanism (ATM) or a similar procedure takes over and calculates the physical address. In systems that employ segmentation tables as part of their vitrual address architecture, a series of firmware elements are employed to store the information on segments, access rights, page allocations, etc., and from this information, determine the physical address. Because of the lengthy process which must be carried out by the firmware, address misses and particularly "thrashes" seriously erode performance.

The invention provides a substantially improved auxilliary memory system 10 which includes a Content Addressable Memory (CAM) 22 as a backup to the address translation buffer 18. Essentially, the CAM structure 22 is a word-organized memory accessed, in the illustrated embodiment, by directly applying, without encoding, eighteen of the upper bits from the virtual address. In a CAM, the access word (the eighteen bits) will drive an output if each bit received is equal to the corresponding bit stored in the address portion of the entry. In FIG. 1, the output of CAM 22 is the physical mapping, (that is, the translation) for the entry stored therein. CAM 22 can be implemented in hardware or, alternatively, it can be formed as part of the computer's microcode employing scratch registers or the like to emulate a CAM design.

In one preferred embodiment, the CAM 22 is activated as soon as a translation miss occurs before employing the operating system to generate a translation. Alternatively, the CAM 22 and the operating system caould be activated at the same time and, if the translation is found in the CAM 22, the firmware search process is deactivated. In another embodiment, the CAM 22 can be polled at the same time that buffer 18 is prompted for the translation.

In any event, if the address translation is found in CAM 22 and not in the buffer 18, the translation can be loading into the buffer 18 immediately rather than await the firmware's address translation mechanism. As described above, the buffer 18 is loaded in the illustrated embodiment by encoding eighteen of the upper virtual address bits into a seven bit code which is used to address an entry. When the address is polled, the buffer yields the physical translation (and the remaining eleven bits of the virtual address are used for confirmation). In one preferred embodiment, the translation is loaded from the CAM 22 into buffer 18 and then the encoder 16 is reset to poll the buffer 18 again and thus restart the process of verifying the data in cache 14. (Other techniques for using the CAM translation to verify the cached data directly rather than load the buffer 18 can also be implemented). It should be appreciated that regardless of the the method by which translation from the CAM 22 is used, the entire process of searching the CAM 22 and obtaining results takes a small fraction of the time necessary to derive the translation from the firmware of the operating system.

Most importantly, the problem of thrashing is solved by the content-addressable memory 22. If two related program components are, in fact, vying for the same location in the buffer 18, the present invention provides a system wherein the translation for one component will be in the buffer 18 while the translation for the other component will only be one step away in the CAM 22. After one iteration both translations will be in the CAM 22 while the buffer 18 alternately holds one or the other translation depending upon current need.

In a simple system, entries in the CAM can be made sequentially with each new translation replacing the oldest entry residing in the CAM (first in, first out). However, it is preferred to have an entry method wherein the least used entries are replaced each time. Such a method can be implemented by registers or other registration means associated with each entry space, each register being incremented whenever the entry is used or decremented when the entry is not used.

Figure 2:
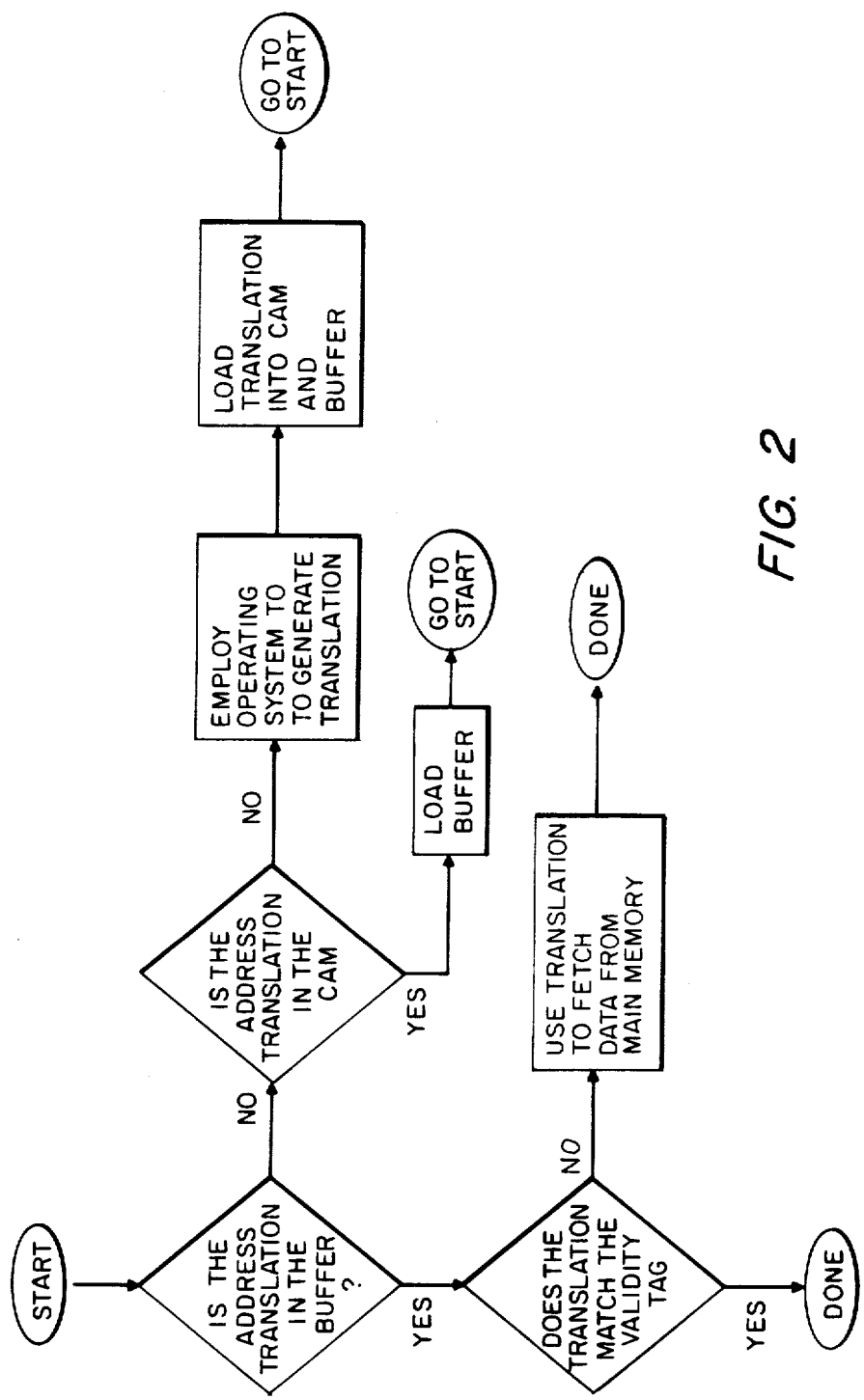
FIG. 2 is a flow chart further describing the address search process of my invention.

The process of the invention is also shown by the flow chart of FIG. 2. The address translation system of the invention initially polls a "lookaside" buffer for a translation of the virtual address to a physical address location in main memory. If a translation is found, it may be used to verify cached data and, if verified, the data may be retrieved from the cache and used immediately. This path is illustrated running down the left side of the chart in FIG. 2. These steps form the most often encountered path, particularly for short programs with good locality of reference. When this path is taken, there is no need for the system to resort to its main memory and the user's program is executed by the high speed auxiliary memory in a highly efficient manner.

In instances where a translation is found but the address does not match the validity tag on the cached data, the system must use the address translation from the lookaside buffer to go out to main memory and fetch the data. This operation, illustrated across the bottom of FIG. 2, is well known in the art and is referred to as a "data miss".

The present invention is directed to situations where a translation miss occurs instead. As shown across the top of FIG. 2, when an address is not found in the lookaside buffer, in the present invention, the hardware next checks the content-associative memory. If a translation is found in the CAM, it is loaded by the hardware in the lookaside buffer and the process begins again. On the next pass, the translation will be found and can be used, as described above, to verify the cached data.

It is only when the translation is not found in either the lookaside buffer or the CAM, that the operating system must resort to the firmware (or the like) to generate an address translation. According to the present invention, when a translation is generated, it is loaded not only into the lookaside buffer but also into the CAM. The process is then started again and will proceed smoothly down the left side of the flow chart in FIG. 2.

In this fashion, the problem of a thrash in the buffer is quickly alleviated. If two address translations compete for the same location, one will be in the buffer initially. When the other address is needed, in a first pass it will be found and stored in both the buffer and the CAM. When the first address is sought again, it will replace the other in the buffer but will also be stored in a second location in the CAM. Once both address translations are stored in the CAM, the system need not resort again to the firmware to generate a translation.

It should be apparent that those skilled in the art can design or program the firmware of a data processor to perform each of the steps described in the flow chart of FIG. 2 and use such programmed instructions in conjunction with the hardware shown and described in connection with FIG. 1.

What is claimed is:

1. In an address translation system for use in a data processing system which employs virtual addressing for referencing a physical memory, said processing system employing a translation buffer means for storing a plurality of addresses together with a translation thereof into physical memory addresses, and means for accessing said translation buffer with an address related to a virtual address for determining if said buffer means has a translation of said virtual address therein, the improvement comprising
   A. a content addressable memory for storing addresses and translations thereof into physical memory, said content addressable memory being substantially smaller than said buffer means,
   B. means for searching said content addressable memory for a translation of a virtual address, and
   C. means for updating said content addressable memory with new addresses and translations.

2. The address translation system of claim 1 wherein the improvement further comprises a means for determining translations not found in the buffer and the CAM and for entering such new translations in the CAM for future use.

3. The system of claim 1 wherein the CAM has a plurality of locations for entering translations.

4. The system of claim 1 wherein the CAM is implemented in hardware.

5. The system of claim 1 wherein the CAM is implemented as a microcode system.

6. An address translation system for use in an auxiliary memory of a computer, the auxiliary memory having a data cache for storing data in association with a tag defining its general location in a main memory, and a buffer means for storing a plurality of addresses together with translations of the corresponding main memory locations, wherein data obtained from the auxiliary memory can be validated by comparing the tag from the cache with the translation from the buffer means, the improvement in the auxiliary memory comprising:
A. a content addressable memory (CAM) for storing at least translations not found in the buffer means;
B. means for searching the CAM for a translation; and
C. means for employing a translation, found in the CAM, to verify cached data.

7. The system of claim 6 wherein the means for employing a translation found in the CAM further comprises a means for loading the translation into the buffer and means for then repeating the process of requesting data from the auxiliary memory.

8. The system of claim 6 wherein the buffer means further comprises a hashing means for listing translations by encoding a set of address bits into a smaller, coded set of bits and the CAM further comprises a memory that is organized for access by the set of address bits without encoding the set.

9. The system of claim 2 wherein said entering means replaces the entries in the content addressable memory sequentially as other missing translations are generated.

10. The system of claim 2 wherein said entering means replaces the entries in the content addressable memory on a least recently used basis.

11. The system of claim 2 further including means for adding the entries in the content addressable memory to the buffer means at the time the entries are generated.

12. A method for providing a translation from a virtual address to a physical address in a data processing system comprising the steps of:
A. storing in a buffer means, according to a predetermined method, translations from a virtual memory address to a physical memory address in a memory having fewer entries than said physical memory,
B. storing further translations from virtual memory addresses to addresses in physical memory in a content addressable memory according to a second predetermined method, and
C. searching said content-addressable memory for a said translation whenever said translation is unavailable in said buffer means.

13. The method of claim 12 further comprising the step of updating translations stored in the content addressable memory sequentially.

14. The method of claim 12 further comprising the step of updating translations stored in the content addressable memory on a least recently used basis.

15. The method of claim 12 wherein the step of storing translations in the buffer further comprises the step of storing translations in the buffer in a coded form and
the step of storing additional translations in the CAM further comprises the step of storing such translations in a non-coded form.

16. The method of claim 12 further comprising the step of employing the operating system to generate a translation when the translation is not found in the buffer and the CAM, and
storing the generated translation in both the buffer and the CAM for future use.

17. A method for validating data stored in a cache in an auxiliary memory of a data processing system, the system having a memory with a plurality of addressable locations; an operating system which provides virtual memory addresses corresponding to main memory locations; and a high speed auxiliary memory for storing a limited amount of data, duplicated from the main memory and cached together with an associated tag field, the method comprising the steps of:
A. storing a plurality of translations in a buffer, which translations can be compared with the tag fields associated with the data in the cache to validate such data;
B. storing additional translations in a Content Addressable Memory (CAM) when such translations are needed but not found in the buffer; and
C. searching the buffer and the CAM for a translation prior to employing the operating system to generate a translation.

* * * * *